United States Patent [19]
Jacob et al.

[11] Patent Number: 5,762,559
[45] Date of Patent: Jun. 9, 1998

[54] WHEEL BEARING UNIT FOR ROTATABLY SUPPORTING A DRIVEABLE WHEEL ON A WHEEL CARRIER

[75] Inventors: Werner Jacob, Frankfurt; Manfred Niederhüfner, Hanau, both of Germany

[73] Assignee: Lohr & Bromlamp GmbH, Offenbach am Main, Germany

[21] Appl. No.: 554,984

[22] Filed: Nov. 13, 1995

[30] Foreign Application Priority Data

Nov. 23, 1994 [DE] Germany .................. 44 41 631.8

[51] Int. Cl.6 ............... F16D 3/24; B60B 27/04; B60K 17/30
[52] U.S. Cl. .................. 464/145; 464/178; 464/906; 384/544
[58] Field of Search .................. 464/145, 178, 464/906, 143; 584/544; 301/124.1

[56] References Cited

U.S. PATENT DOCUMENTS

| | | | |
|---|---|---|---|
| 4,240,680 | 12/1980 | Krude et al. | 464/145 X |
| 4,427,085 | 1/1984 | Aucktor | 464/178 X |
| 4,440,256 | 4/1984 | Palmer | 384/544 X |
| 4,473,129 | 9/1984 | Guimbretiere | 464/906 X |
| 4,529,254 | 7/1985 | Krude | 464/178 X |
| 4,621,700 | 11/1986 | Merkelbach | 464/178 X |
| 4,784,441 | 11/1988 | Welschof et al. | |
| 4,858,998 | 8/1989 | Welschof et al. | |
| 4,893,960 | 1/1990 | Beier et al. | |
| 4,917,510 | 4/1990 | Jacob | 384/503 |
| 4,966,473 | 10/1990 | Jacob | 384/544 X |
| 4,995,850 | 2/1991 | Van Der Drift et al. | 464/906 X |
| 5,156,571 | 10/1992 | Kapaan et al. | 464/143 |

FOREIGN PATENT DOCUMENTS

| | | |
|---|---|---|
| 1902942 | 8/1970 | Germany . |
| 5780904 | 5/1982 | Japan . |
| 5780905 | 5/1982 | Japan . |
| 6026728 | 6/1986 | Japan . |
| 1241620 | 8/1971 | United Kingdom . |
| 2088526 | 6/1982 | United Kingdom . |

*Primary Examiner*—Daniel P. Stodola
*Assistant Examiner*—Emmanuel M. Marcelo
*Attorney, Agent, or Firm*—Harness, Dickey & Pierce, P.L.C.

[57] ABSTRACT

A wheel bearing unit (9) rotatably supports a drivable wheel on a wheel carrier (10) around a rotational axis (15) and has a double-row tapered seat ball bearing with an outer bearing ring (20) attached to the wheel carrier (10) and a central bearing plane (24). The inner tracks (16, 17) are worked into the outer face (19) of an outer joint member (11) which carries a flange (12). The outer ball running grooves (30), formed into the outer joint member (11), are arranged opposite inner running grooves (35) of an inner joint member (34). The grooves, together with a cage (36) and guide balls (37), transmit torque. The inner joint member (34) is pivotable around the joint center (42) relative to the outer joint member (11). The central bearing plane (24) is offset from the joint center (42) by a distance sufficient to achieve the smallest possible rolling circle diameter. This leads to a lightweight unit which additionally ensures that during the transmission of torque, the joint does not adversely affect the bearing in the wheel carrier (10).

10 Claims, 3 Drawing Sheets

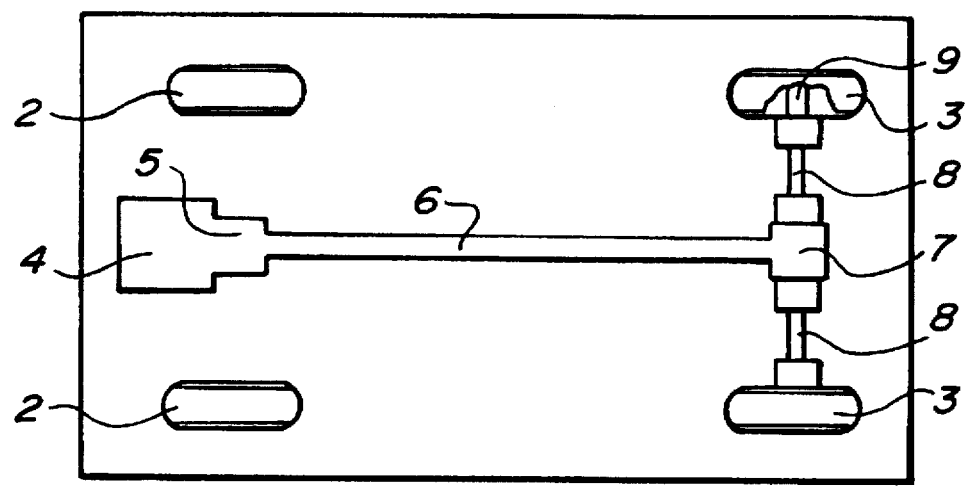
Fig-1

WHEEL BEARING UNIT FOR ROTATABLY SUPPORTING A DRIVEABLE WHEEL ON A WHEEL CARRIER

The invention relates to a wheel bearing unit to rotatably support a drivable wheel around a rotational axis on a wheel carrier of a motor vehicle. The wheel bearing unit has an outer bearing ring attached to the wheel carrier. The ring includes two outer parallel tracks to receive rolling members. A constant velocity universal joint, which includes an outer hollow joint member and an inner joint member, is accommodated by the ring. The constant velocity joint is pivotable in all directions around the joint center. The outer and inner joint members include opposed outer and inner running grooves which extend in meridian planes. Balls are received between the running grooves to transmit torque and are held by a cage. The outer joint member, on its outer face, has two inner parallel tracks to receive rolling members. The tracks are arranged opposite the outer tracks. The rolling members are rollingly received between the tracks, which constitute track pairs. A plane which extends centrally between the track pairs forms the central bearing plane relative to which the joint center is arranged with an offset. The outer joint member is provided with a flange which extends radially outwardly away from the rotational axis. The flange attaches the wheel and optionally parts of a wheel brake. The outer running grooves of the outer joint member is designed to be undercut-free, staring from a first aperture adjoining the flange.

U.S. Pat. No. 4,529,254 describes a wheel bearing unit where the inner tracks for the bearing in the wheel carrier are arranged in an axial region of the outer face of the outer joint member. The axial region also contains the outer running grooves of same. This means that there exists a relatively large rolling circle diameter for the rolling members supporting the outer joint member in the wheel carrier. This also results in a high circumferential speed of the rolling members. Since the outer bearing ring is also in one part, a small number of balls are present in order to allow insertion of the balls. Furthermore, a relatively large space is required in the radial direction. Such an assembly is only suitable in those cases where wheels with a large radial space can be used. Furthermore, as the outer joint member is subjected to high torque loads and, in consequence, subject to elastic deformation, the running of the bearing is adversely affected or a relative great material thickness is required.

Furthermore, in DE-OS 19 02 942, published Aug. 20, 1970, a vehicle wheel bearing is described where the inner ring of a double-row tapered seat ball bearing is secured to a cylindrical neck portion of a hub. The outer ring of the ball bearing is received in the wheel carrier. The hub has a flange-like projection, with axially projecting wheel bolts. The outer joint member of a separate constant velocity joint is secured to the wheel bolts. In the axial direction, a brake disc and the rim well of a wheel follows. Such an assembly comprises a large number of individual parts and a large diameter for the outer joint member. In consequence, the assembly is relatively heavy.

SUMMARY OF THE INVENTION

It is an object of the invention to provide a wheel bearing unit which includes a small number of components and a low weight, however, at the same time, permits a small rolling circle diameter for the rolling members supporting the wheel. A further object of the invention is to prevent the bearing function from being affected by the transmission of torque.

In accordance with the invention, the joint center is offset from the central bearing plane towards the flange. A connecting journal is connected to the inner joint member or a connected shaft emerges from the outer joint member out of an aperture adjoining the inner tracks. The offset is dimensioned such that the first of the two inner tracks is arranged to adjoin the inner end of the outer running grooves of the outer joint member.

An advantage of this solution is that by offsetting the joint center outwardly, in a condition as fitted in the vehicle, away from the differential towards the wheel flange, it becomes possible to extend the intermediate shaft between the joint articulation centers of the two joints of a driveshaft arranged between the wheel and differential. Thus, with identical maximum compression and rebound values of the wheel, the angle at the joints is smaller. The offset enables the tracks of the rolling-contact bearing, which are a double-row angular contact ball bearing to provide support in the wheel carrier, to be arranged substantially axially next to the outer running grooves in the outer joint member. Thus, the running characteristics of the rolling-contact bearing cannot be influenced by the joint. Furthermore, such an arrangement reduces the rolling circle diameter of the double-row angular contact ball bearing. This measure results in an overall more lightweight unit. Furthermore, it is possible to fit the joint axially because the inner joint member can be introduced into the outer joint member from the outside, from the flange end.

A particularly advantageous application as compared to conventional designs, as described in DE-OS 19 02 942, exists in the case of rear wheel drive vehicles. In these embodiments, constant velocity plunging joints are provided. When using a wheel bearing unit according to the invention, with a constant velocity universal joint in the form of a fixed joint in an integrated version, the joint at the gearbox end may also be a fixed joint with separate plunging means arranged towards the joint at the gearbox end for example. Such solutions are described in U.S. patent applications Ser. No. 08/456,177 filed May 31, 1995 and 08/448,838 filed May 24, 1995, for example. As a rule, the diameter of constant velocity fixed joints can be dimensioned more advantageously than that of constant velocity joints which enable both articulation and a plunging movement.

By applying the above-mentioned measures, it is possible to provide adequate space to provide a parking brake arranged within a drum carrying the brake disc for the service brake. In a preferred embodiment, the outer joint member together with the flange is produced as a solid part. Preferably the outer joint is produced by a non-chip producing forming operation with formed outer running grooves. Alternatively, the outer joint member together with the flange is produced as a formed plate metal part. The flange provides adequate strength for the joint member portion containing the outer running grooves. Such a reinforcement exists especially in those cases where the outer running grooves of the outer joint member extend as far as and into an outer joint member region formed by the flange thickness. The strength properties of a solid part may be improved further if, starting from the first inner track closest to the flange towards the inner face of the flange, the outer face of the outer joint member extends so as to rise curve-like away from the rotational axis.

The two inner tracks preferably form part of a recess in the outer face of the outer joint member. The smallest diameter of the recess is equal to or smaller than the diameter of an imaginary circle which touches the track base of the outer running grooves in the region of the first aperture from where they start.

The rolling circle diameter of the rolling members of the double-row angular contact ball bearing may also be reduced in that, in a transverse plane, the outer bearing ring includes at least one join produced by a blasting operation. By separating the outer bearing ring, a larger number of balls can be introduced, thus achieving a high load bearing factor. In consequence, the overall bearing diameter can be reduced.

In order to ensure the necessary freedom of movement of the journal or shaft connected to the inner joint member of the constant velocity joint relative to the outer joint member during articulation, the cavity of the outer joint member increases in size towards its second aperture remote from the flange.

The inner joint member is preferably integral with a connecting journal or shaft. The connection with a further shaft portion which leads to the second joint of the sideshaft or forms part of a plunging element ensures a smaller diameter Thus, this measure, too, overall leads to a wheel bearing unit whose diameter is reduced as compared to the state of the art where the region of separation between the shaft connected to the inner joint member and the inner joint member is located directly at the joint member in that the shaft is inserted into a bore of the inner joint member. Such a solution increases the diameter of the inner joint member.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment and application of the wheel bearing unit in accordance with the invention is diagrammatically illustrated in the drawing wherein:

FIG. 1 is a diagrammatic illustration view of the drive concept of a motor vehicle.

DETAILED DESCRIPTION OF THE DRAWINGS

Figure 2:
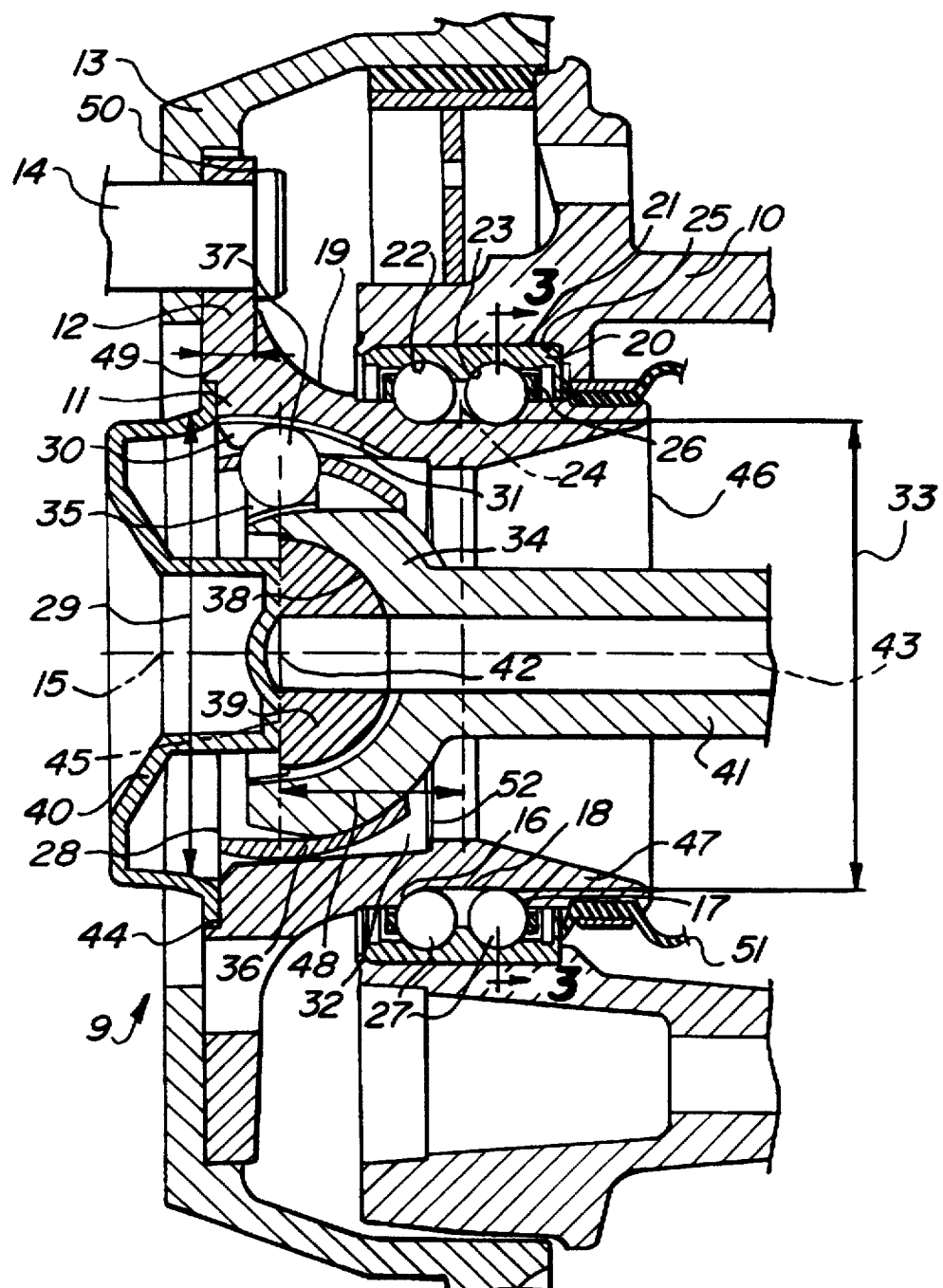
FIG. 2 is a longitudinal section view through a wheel bearing unit, in accordance with the invention.

FIG. 1 shows the drive concept of a motor vehicle 1, for instance a passenger car, which includes two front wheels 2 and two rear wheels 3 associated with the driven rear axle. The engine 4 is arranged In the region of the front axle which drives a gearbox 5 which, by means of a propeller shaft 6, is rotationally connected to the differential 7 of the rear axle. The two outputs of the differential 7 are each connected to a driveshaft in the form of a sideshaft 8. The sideshaft 8 includes a first constant velocity joint arranged near the differential 7 and a second joint integrated into a wheel bearing unit 9 in the region of the driven rear wheel 3. The two constant velocity joints are connected by an intermediate shaft. Both constant velocity joints may be fixed joints, thus only enabling angular movement, but no axial adjustment. Thus, a separate plunging part is provided which is either associated with the intermediate shaft, arranged between the two joints, or is partially integrated into the constant velocity joint associated with the differential 7.

Figure 3:
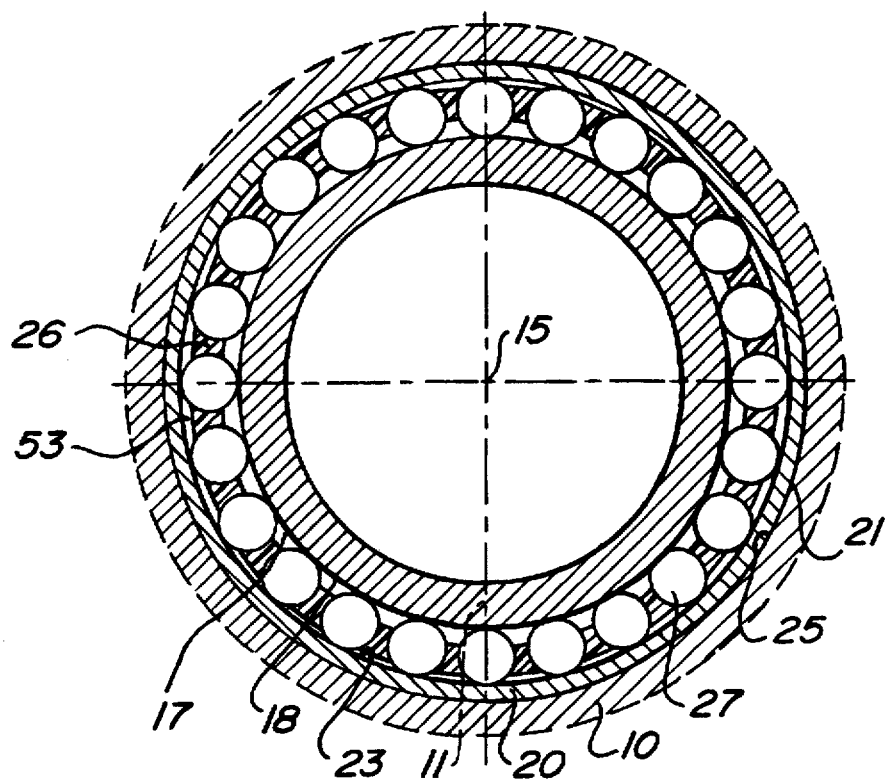
FIG. 3 is a cross-section view of FIG. 2, along line 3—3 thereof.

FIGS. 2 and 3 show a detail according to FIG. 1 in an enlarged scale, illustrating the wheel bearing unit 9 supported on the wheel carrier 10. The outer joint member 11 includes a flange 12 with a drum 13. The drum 13 receives the parking brake and the disc for the service which is connected by wheel bolts 14.

The outer joint member 11 is rotatable relative to the wheel carrier 10 around the rotational axis 15. To achieve this, a double-row angular contact ball bearing is provided whose parallel inner tracks 16, 17 are worked into the outer face 19 of the outer joint member 11. For this purpose, the outer joint member 11 includes a recess 18 with the diameter 33.

An outer bearing ring 20 whose outer face 21 is received in the bore 25 of the wheel carrier 10 is coaxially arranged around the part of the outer joint member 11 which includes the recess 18. The outer bearing ring 20 also includes two outer running tracks 22, 23 which extend parallel relative to one another. Rolling members 27, in the form of balls, are received between track 22, 23 and inner track 16, 17. The rolling members 27 are circumferentially distributed relative to the rotational axis 15. Contact lines occur and are arranged at an angle relative to the rotational axis 15.

The rolling members 27 are spaced in a cage 26. The two tracks 16, 22 form a first pair of tracks and the two tracks 17, 23 a second pair. A central bearing plane 24 occurs centrally between the two track pairs 16, 22 and 17, 23. After the outer bearing ring 20 has been produced to its finish-dimensions, it may be separated in one place by the application of pressure for example, thus producing the joint 53. Such an operation is referred to as "blasting". A wheel bearing unit with an outer bearing ring blasted in a radial plane containing the rotational axis 15 is described in U.S. Pat. Nos. 4,966,473 and 4,917,510, the specifications of which are expressly incorporated by reference, for example.

The outer joint member 11 is hollow and includes a cavity 32 with a first aperture 28 adjoining the flange 12 and a second aperture 46 removed from the flange. Outer running grooves 30, positioned in meridian planes, are formed into the cavity 32 of the outer joint member 11, starting from the first aperture 28. In the region of the first aperture 28, the outer running grooves 30 include their greatest opening width. In the region of the first aperture 28, the -track base of the outer running grooves 30 is touched by a circle which includes diameter 29. The outer running grooves 30 start from the first aperture end 28 and extend towards the second aperture 46 in an undercut-free way, their track base approaches the rotational axis 15. The inner end of the outer running grooves 30 has been given the reference number 31. It can be seen that the inner end 31, if viewed in the axial direction from the first aperture 28, ends in front of the recess 18 in the outer face 19 of the outer joint member 11, there is only a small amount of overlap. However, as in this region the track base approaches the rotational axis 15, and an adequate material thickness exists between the track base of the outer running grooves 30 and the first inner track 16 close to the flange 12.

In the region following the end 31 of the outer running grooves 30, the cavity 32 initially changes into a region with a reduced diameter and is then increased or expanded in size. The expanded part 47 extends as far as the second aperture 46 of the outer joint member 11. The diameter 33 of the recess 18 is preferably equal to or smaller than the diameter 29 of the circle which touches the track base of the outer running grooves 30 in the region of the first aperture 28.

The inner joint member 34 and the cage 36 are received in the cavity 32. The inner joint member 34 includes inner running grooves 35. The inner running grooves 35 are also arranged in meridian planes and are each positioned opposite an outer running groove 30 of the outer joint member 11. Both grooves 30, 35, jointly, accommodate a ball 37 which is held and guided by the cage 36. The ball 37 projects radially outwardly and inwardly from windows of the cage 36. The cage 36 is held in contact with the inner joint member 34 by the balls 37. Furthermore, the inner joint member 34 includes a control face 38 which is designed as a hollow spherical partial face. The control face center is centered on the rotational axis 15 and the joint center 43.

A control element 39, in the form of a spherical layer, is guided on the control face 38 by its spherical outer face. Furthermore, the control element 39 includes a planar face by which it is guided on a corresponding supporting face 45 of a supporting element 40. The supporting element is centered and received in a recess 44 in the region of the first aperture 28. A retaining plate 52, in the form of an annular disc, serves to retain grease in the region between the outer joint member 11 and the inner joint member 34 and the balls 37.

It can also be seen that the inner joint member 34, together with its integral connecting journal 41, is pivotable around the joint center 42. The longitudinal axis of the connecting journal 41 has been given the reference number 43. It is able to assume an angular position relative to the rotational axis 15.

Between the central bearing plane 24 and the joint center 42, an offset 48 occurs. The offset 48 is dimensioned such that, on one hand, it is possible for the necessary articulation to occur between the connecting journal 41 and the outer joint member 11 and thus between the inner joint member 34 and the outer joint member 11. Thus, on the other hand, it is possible to achieve as small as possible a diameter 33 of the recess 18 to obtain as lightweight a unit as possible.

The outer running grooves 30 extend into the region of the thickness 49 of the flange 12. Thus, a considerable amount of material is available radially outside and above the track base of the outer running grooves 30. Furthermore, the outer face 19 of the outer joint member 11 is such that it rises curvalinear, starting from the recess 18 towards the inner face 50 of the flange 12. A convoluted boot 51, in outline only, is provided to seal the unit between the outer joint member 11 and the connecting journal 41.

While the above detailed description describes the preferred embodiment of the present invention, the invention is susceptible to modification, variation and alteration without deviating from the scope and fair meaning of the subjoined claims.

We claim:

1. A wheel bearing unit for rotatably supporting a drivable wheel on a wheel carrier of a motor vehicle around a rotational axis, comprising:

an outer bearing ring for attaching to the wheel carrier, said ring includes two outer parallel tracks for rolling members;

a constant velocity universal joint including an outer hollow joint member and an inner joint member, said inner joint member accommodated in said outer hollow joint member so as to be pivotable in all directions around a joint center, said outer and inner joint members include opposed outer and inner running grooves which extend in meridian planes and include balls received therebetween for transmitting torque, the ball being held by a cage, said outer joint member defining a wall with an inner face including said outer running grooves and an outer face, in its outer face, having two inner parallel tracks for the rolling members, said inner tracks are arranged opposite the outer tracks and between which the rolling members are rollingly received and constitute track pairs;

a plane extending centrally between the track pairs forming a central bearing plane relative to which the joint center is offset;

the outer joint member being provided with a unitary flange which extends radially outwardly away from the rotational axis and said flange adapted to attach the wheel, said outer running grooves of the outer joint member being designed to be undercut-free, starting from a first aperture adjoining the flange, the joint center is offset from the central bearing plane towards the flange and ending at an inner end;

that the two inner parallel tracks form a first inner track and a second inner track;

a connecting journal connected to the inner joint member or a connecting shaft connected to the inner joint member emerges from the outer joint member out of an aperture adjoining the inner tracks;

and the offset is dimensioned such that the first of the two inner tracks is arranged to adjoin the inner end of the outer running grooves of the outer joint member.

2. A wheel bearing unit according to claim 1, wherein the outer joint member, together with the flange is produced as a solid part by a non-chip producing forming operation, with a formed in outer running grooves.

3. A wheel bearing unit according to claim 1, wherein the outer joint member, together with the flange, is produced as a formed plate metal part.

4. A wheel bearing unit according to claim 1, wherein the outer running grooves of the outer joint member extend as far as and into a region of the outer joint member formed by the flange thickness.

5. A wheel bearing unit according to claim 1, wherein from the first inner track closest to the flange, the outer face of the outer joint member extends so as to rise curvilinearly away from the rotational axis.

6. A wheel bearing unit according to claim 1, wherein the two inner tracks form part of a recess in the outer face of the outer joint member.

7. A wheel bearing unit according to claim 6, wherein the smallest diameter of the recess is equal to or greater than a diameter of an imaginary circle which touches a track base of the outer running grooves in the region of the first aperture from where the grooves start.

8. A wheel bearing unit according to claim 1, wherein in a transverse plane, the outer bearing ring includes at least one joint produced by a blasting operation.

9. A wheel bearing unit according to claim 1, wherein a cavity is formed in the outer joint member and increases in size towards a second aperture remote from the first aperture adjoining the flange.

10. A wheel bearing unit according to claim 1, wherein the inner joint member is integral with a shaft or a connecting journal.

* * * * *